(12) United States Patent
Chen et al.

(10) Patent No.: US 11,656,475 B2
(45) Date of Patent: May 23, 2023

(54) STRUCTURED LIGHT PROJECTOR

(71) Applicant: LIQXTAL TECHNOLOGY INC., Tainan (TW)

(72) Inventors: Hung-Shan Chen, Tainan (TW); Yen-Chen Chen, Tainan (TW)

(73) Assignee: LIQXTAL TECHNOLOGY INC., Tainan (TW)

(*) Notice: Subject to any disclaimer, the term of this patent is extended or adjusted under 35 U.S.C. 154(b) by 0 days.

(21) Appl. No.: 17/581,823

(22) Filed: Jan. 21, 2022

(65) Prior Publication Data

US 2022/0146846 A1 May 12, 2022

Related U.S. Application Data

(62) Division of application No. 15/970,856, filed on May 3, 2018, now Pat. No. 11,269,193.

(60) Provisional application No. 62/590,662, filed on Nov. 27, 2017.

(51) Int. Cl.
| | |
|---|---|
| *G02B 27/42* | (2006.01) |
| *G01B 11/25* | (2006.01) |
| *G02B 5/32* | (2006.01) |
| *G03B 21/00* | (2006.01) |
| *G02B 5/30* | (2006.01) |
| *H04N 13/254* | (2018.01) |
| *G02B 27/28* | (2006.01) |
| *G03B 21/20* | (2006.01) |
| *G01N 21/88* | (2006.01) |

(52) U.S. Cl.
CPC ........ *G02B 27/425* (2013.01); *G01B 11/2513* (2013.01); *G02B 5/3083* (2013.01); *G02B 5/32* (2013.01); *G02B 27/286* (2013.01); *G03B 21/00* (2013.01); *H04N 13/254* (2018.05); *G01N 2021/8829* (2013.01); *G03B 21/20* (2013.01)

(58) Field of Classification Search
CPC .. G02B 27/425; G02B 27/286; G02B 5/3083; G02B 27/0944; G02B 27/0955; H04N 13/254
USPC ............ 359/489.07, 489.12, 489.13, 489.15, 359/489.16
See application file for complete search history.

(56) References Cited

U.S. PATENT DOCUMENTS

| | | | | |
|---|---|---|---|---|
| 3,588,224 | A * | 6/1971 | Pritchard ................. | H04N 9/07 348/E9.003 |
| 4,575,193 | A * | 3/1986 | Greivenkamp, Jr. ...................... | G02B 27/0988 348/E9.003 |
| 5,546,219 | A * | 8/1996 | Iida ......................... | G02F 1/093 359/263 |

(Continued)

*Primary Examiner* — Ricky D Shafer
(74) *Attorney, Agent, or Firm* — JCIPRNET (57) ABSTRACT

An optical sensing device adopted to use structured light to detect an object is provided. The optical sensing device includes a structured light projector and a sensor. The structured light projector includes a light source and at least one beam multiplication film. The light source is configured to emit a light beam. The at least one beam multiplication film is disposed on a transmission path of the light beam and is made of anisotropic refractive index material, wherein a plurality of separated light beams are produced after the light beam from the light source passes through the at least one beam multiplication film, so as to form the structured light. The sensor is configured to sense the structured light reflected from the object. Besides, a structured light projector is also provided.

8 Claims, 7 Drawing Sheets

(56) References Cited

U.S. PATENT DOCUMENTS

| | | | |
|---|---|---|---|
| 6,529,307 B1* | 3/2003 | Peng | H04B 10/2569 |
| | | | 359/256 |
| 8,749,796 B2* | 6/2014 | Pesach | G01B 11/25 |
| | | | 356/610 |
| 10,731,976 B2* | 8/2020 | Chen | G01B 11/254 |
| 11,126,060 B2* | 9/2021 | Chen | G01S 7/4814 |
| 11,269,193 B2* | 3/2022 | Chen | G03B 21/00 |
| 11,474,366 B2* | 10/2022 | Chen | G02B 27/0922 |
| 11,474,410 B2* | 10/2022 | Chen | G02F 1/31 |
| 2004/0001255 A1* | 1/2004 | Fratello | G02B 5/3025 |
| | | | 359/484.05 |
| 2018/0073864 A1* | 3/2018 | Watanabe | G01B 9/02001 |
| 2019/0101791 A1* | 4/2019 | Chen | G02F 1/133526 |

* cited by examiner

STRUCTURED LIGHT PROJECTOR

CROSS-REFERENCE TO RELATED APPLICATION

This application is a divisional application of and claims the priority benefit of a prior U.S. application Ser. No. 15/970,856, filed on May 3, 2018, now allowed, which claims the priority benefit of U.S. provisional application Ser. No. 62/590,662, filed on Nov. 27, 2017. The entirety of each of the above-mentioned patent applications is hereby incorporated by reference herein and made a part of this specification.

BACKGROUND

Technical Field

The invention generally relates a sensing device and a light projector, and, in particular, to an optical sensing device and a structured light projector.

Description of Related Art

A structured light three-dimensional (3D) sensing device measures surface contours of an object by projecting light patterns on the object and sensing the deformation of the patterns on the object. The advantages of the structured light 3D sensing device are speed and precision since the structured light 3D sensing device senses multiple points at once instead of sensing one point at a time.

In order to generate the light patterns, a diffractive optical element may be used with monochromatic light, such as a laser beam, to divide the laser beam into a number of light beams, so as to form structure light. However, the light intensities among those light beams are not similar. In addition, while the configuration between the diffractive optical element and the laser light source is not appropriate, the intensity of the light corresponding to direct transmission (i.e. zero order) may be too strong, which causes a problem of safety.

SUMMARY

The invention provides an optical sensing device and a structured light projector which use a simple and effective way to multiply a light beam so as to form structured light.

According to an embodiment of the invention, an optical sensing device adopted to use structured light to detect an object is provided. The optical sensing device includes a structured light projector and a sensor. The structured light projector includes a light source and at least one beam multiplication film. The light source is configured to emit a light beam. At least one beam multiplication film is disposed on a transmission path of the light beam and is made of anisotropic refractive index material, wherein a plurality of separated light beams are produced after the light beam from the light source passes through the at least one beam multiplication film, so as to form the structured light. The sensor is configured to sense the structured light reflected from the object.

According to an embodiment of the invention, a structured light projector including a light source, at least two beam multiplication films and a wave plate is provided. The light source is configured to emit a light beam. At least two beam multiplication films are disposed on a transmission path of the light beam and are made of anisotropic refractive index material, wherein a plurality of separated light beams are produced after the light beam from the light source passes through any one of the at least two beam multiplication films, so as to form structured light. The wave plate is disposed between adjacent two of the at least two beam multiplication films, wherein a polarization state of the light beam is changed from linear polarization to circular polarization or elliptical polarization after the light beam passes through the wave plate.

According to an embodiment of the invention, a structured light projector including a light source and at least two beam multiplication films is provided. The light source is configured to emit a light beam. The at least two beam multiplication films are disposed on a transmission path of the light beam, wherein a plurality of separated light beams are produced after the light beam from the light source passes through any one of the at least two beam multiplication films, so as to form structured light, and optical axes of the at least two beam multiplication films are inclined relative to a transmission direction of the light beam emitted from the light source.

Based on the above, the structured light projector provided by one of the embodiments of the invention includes at least one beam multiplication film made of anisotropic refractive index material. Since the light beam from the light source is split by the at least one beam multiplication film into multiple light beams corresponding to a plurality of polarization directions, so that the structured light projector of the embodiment of the invention is capable of effectively producing structured light by using a simple structure. Besides, the structured light projector provided by one of the embodiments of the invention uses the aforementioned structured light projector, and therefore is capable of producing structured light by using a simple and effective way.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
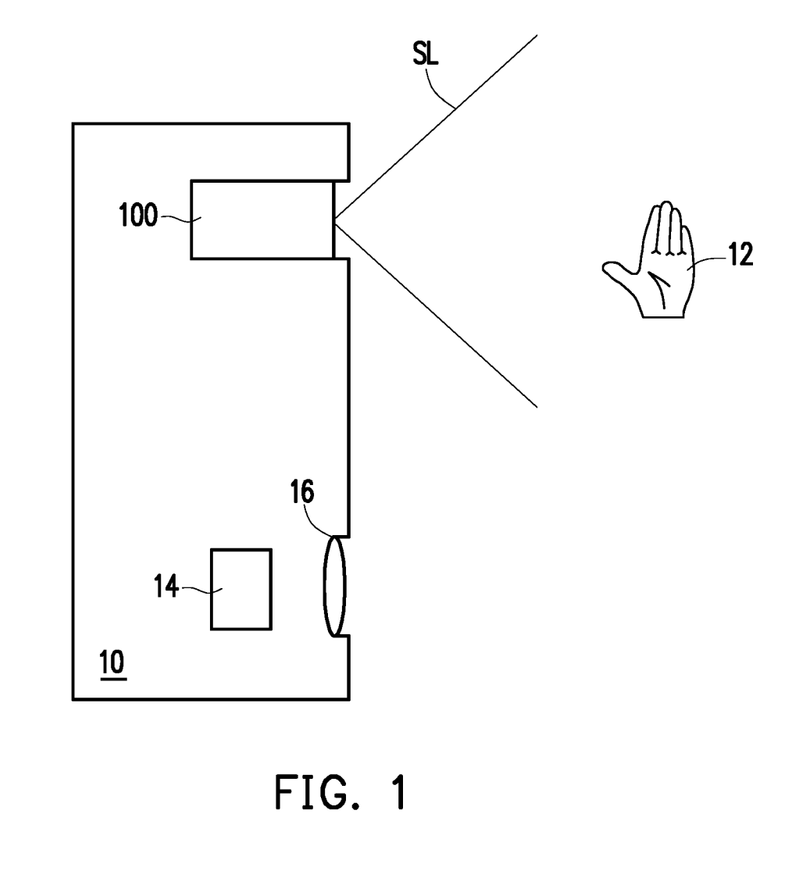
FIG. 1 is a schematic cross-sectional view of an optical sensing device according to an embodiment of the invention.
Figure 2:
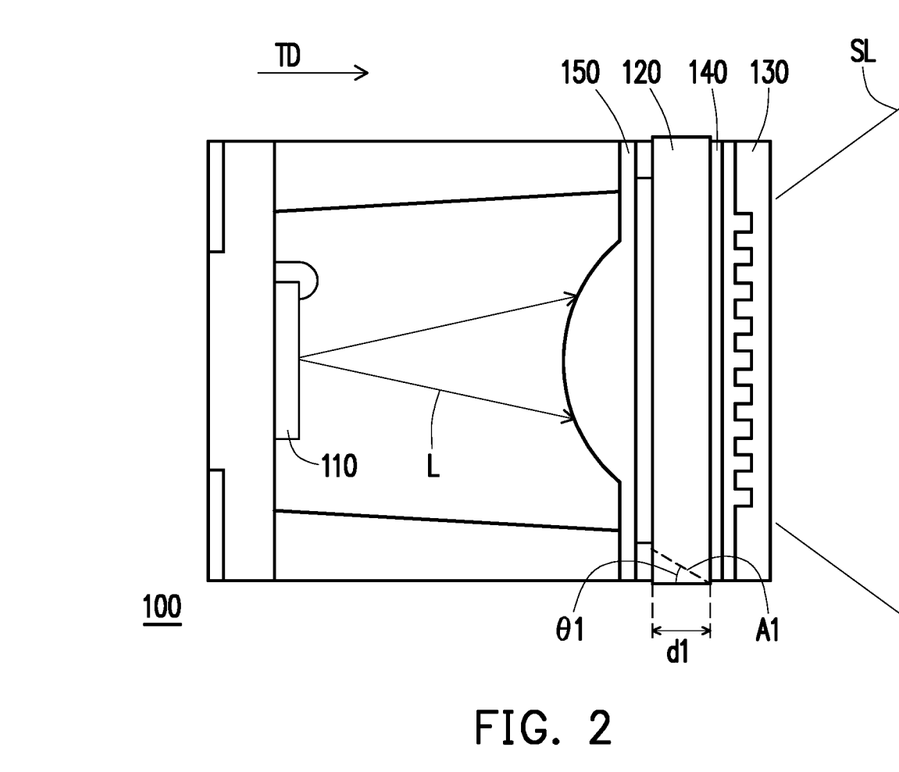
FIG. 2 is a schematic cross-sectional view of a structured light projector of FIG. 1.

FIG. 1 is a schematic cross-sectional view of an optical sensing device according to an embodiment of the invention. FIG. 2 is a schematic cross-sectional view of a structured light projector of FIG. 1. First, referring to FIG. 1, an optical sensing device 10 of the present embodiment is adopted to use structured light SL to detect an object 12. The optical sensing device 10 includes a structured light projector 100 and a sensor 14. The structured light projector 100 is configured to produce the structured light SL. The sensor 14 is configured to sense the structured light SL reflected from the object 12. In addition, the optical sensing device 10 may further include a lens 16 disposed in front of the sensor 14.

In the present embodiment, the object 12 is, for example, a human face, a hand or an object having 3D surface contours. When the structured light SL is projected on the object 12, the light pattern of the structured light SL may deform due to the concave-convex surface of the object 12. The sensor 14 senses the deformation of the light pattern on the object 12 so as to calculate the depths of the surface of the object 12, i.e. distances from a camera of the sensors 14.

Figure 3:
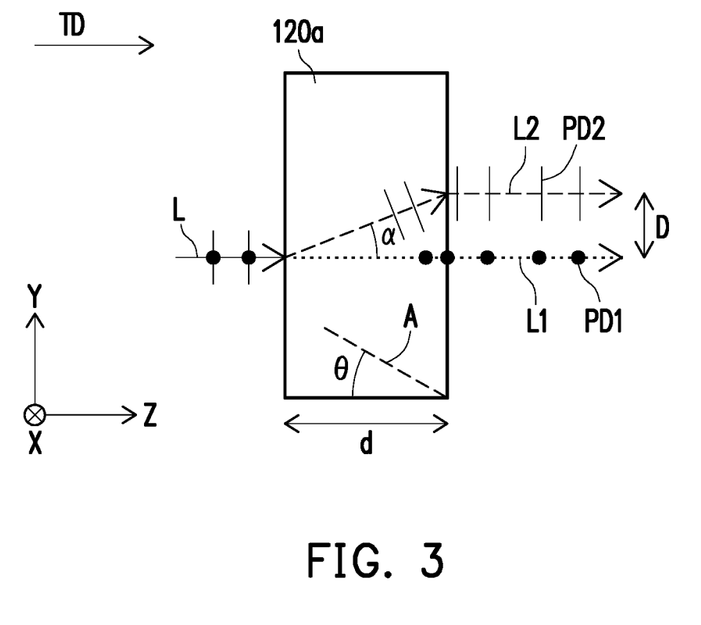
FIG. 3 is a schematic cross-sectional view of the light propagation in a beam multiplication film.

Then, referring to FIG. 2, the structured light projector 100 includes a light source 110 and at least one beam multiplication film 120 (for example, FIG. 2 illustrates one beam multiplication film 120). The light source 110 is configured to emit a light beam L. The beam multiplication film 120 is disposed on a transmission path of the light beam L and is made of an anisotropic refractive index material, wherein a plurality of separated light beams (for example, as illustrated in FIG. 3) are produced after the light beam L from the light source 110 passes through the beam multiplication film 120, so as to form the structured light SL. In the present embodiment, the beam multiplication film 120 may be a flexible film fabricated by, for example, roll-to-roll process similar to the compensation film of the liquid crystal display. In the present embodiment, the beam multiplication film 120 may be a uniaxial retardation film, a biaxial retardation film, or an oblique axial retardation film, but is not limited thereto. Besides, an optical axis A1 of the beam multiplication film 120 is inclined relative to a transmission direction TD (for example, left-right direction of FIG. 2) of the light beam L emitted from the light source 110 by an angle θ1. That is, the optical axis A1 is not parallel or perpendicular to the transmission direction TD. For example, the angle θ1 may be larger than 0 degree and less than 90 degrees, or may be larger than 90 degrees and less than 180 degrees.

The optical mechanism of the beam multiplication film 120 will be introduced below. FIG. 3 is a schematic cross-sectional view of the light propagation in a beam multiplication film. Referring to FIG. 3, when an unpolarized light beam L is incident upon a beam multiplication film 120a, for example, a uniaxial retardation film, the light beam L is split into an ordinary beam L1 and an extraordinary beam L2 taking different paths. The ordinary beam L1 has a polarization direction PD1 perpendicular to a reference plane (e.g. parallel to the YZ plane) in which the inclined angle θ of the optical axis A of the beam multiplication film 120a exists, and the extraordinary beam L2 has a polarization direction PD2 perpendicular to the polarization direction PD1. The thickness d of the beam multiplication film 120a, the inclined angle θ of the optical axis A of the beam multiplication film 120a relative to a transmission direction TD of the light beam L and the lateral displacement D between the ordinary beam L1 and the extraordinary beam L2 satisfy the expressions: D=d×tan α, and $$D = d \times \tan\alpha, \text{ and } \cot(\alpha + 45°) = \frac{n_e^2}{n_o^2}\cot\theta,$$

wherein α is the angle between the ordinary beam L1 and the extraordinary beam L inside the beam multiplication film 120a, while $n_e$ and $n_o$ are the ordinary refractive index and the extraordinary refractive index of the beam multiplication film 120a, respectively.

By setting the optical axis A of the beam multiplication film 120a to be inclined relative to the transmission direction TD of the light beam L, one light beam L can be split into two beams. Therefore, one light beam L may be split into multiple beams through the design of multiple films. In addition, each of the light intensities of the ordinary beam L1 and the extraordinary beam L2 is approximately 50 percent of the intensity of the original light beam L. Hence, the structured light projector of the embodiment of the invention is capable of producing structured light made up of multiple beams with similar intensity.

In the present embodiment, the light source 110 can be, for example, an edge emitting laser or a vertical-cavity surface-emitting laser (VCSEL), but is not limited thereto. If the light source 110 is an edge emitting laser, the edge emitting laser and the beam multiplication film 120 can be used to simulate a VCSEL. If the light source 110 is a VCSEL, the VCSEL and the beam multiplication film 120 can be used to simulate a smaller pitch VCSEL for realizing higher density of illumination points without the problem of heat dissipation caused by small pitch between the illumination points, which helps the reliability and the resolution of the VCSEL.

Referring to FIG. 2 again, the structured light projector 100 further includes a diffractive optical element 130 and a wave plate 140. The diffractive optical element 130 is configured to perform at least one of beam shaping and beam multiplication, and the beam multiplication film 120 is disposed between the light source 110 and the diffractive optical element 130. The wave plate 140 is disposed between the beam multiplication film 120 and the diffractive optical element 130. In the embodiment, the wave plate 140 is, for example, a quarter wave plate. Specially, the polarization state of the light beam L is changed to linear polarization after passing through the beam multiplication film 120, while some diffractive optical elements may be sensitive to the polarization of the light beam L. When the polarized light beam L passes through the wave plate 140, the polarization state of the polarized light beam L can be changed from linear polarization to circular polarization or elliptical polarization. Therefore, the configuration of the wave plate 140 can prevent the diffractive optical element 150 from being affected by the polarization of the light beam L. However, if the diffractive optical element 130 is not sensitive to the polarization of the light beam L, the structured light projector 100 may not include the wave plate 140.

In addition, the fabrication tolerance of the diffractive optical element 130 can be increased by using the beam multiplication film 120. To be specific, since a plurality of separated light beams are produced in advance after the light beam L from the light source 110 passes through the beam multiplication film 120, the demand for beam multiplication capability of the diffractive optical element 130 can be reduced. For example, if twenty thousand light beams are needed to be produced by the structured light projector 100, and the light beam L from the light source 110 (for example, an edge emitting laser) is split into, for example, sixteen light beams after passing through the beam multiplication film 120. Instead of one light beam, sixteen light beams are split into twenty thousand light beams after passing through the diffractive optical element 150. (That is, one light beam is needed to be split into merely 1250 light beams after passing through the diffractive optical element 130.)

In the embodiment, the structured light projector 100 can further include a lens module 150 disposed on the transmission path of the light beam L, and the lens module 150 is configured to perform at least one of beam shaping and beam collimation. In the present embodiment, the lens module 150 is disposed between the light source 110 and the beam multiplication film 120. In other embodiments, the lens module 150 can be disposed between the beam multiplication film 120 and the wave plate 140, or can be disposed between the wave plate 140 and the diffractive optical element 130, but is not limited thereto.

Figure 4A:
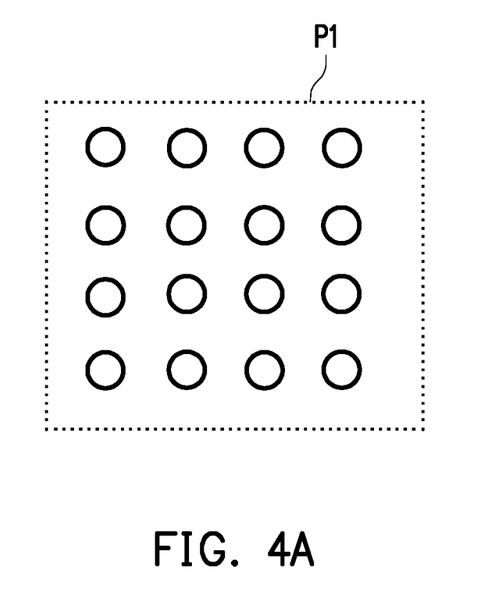
FIG. 4A and FIG. 4B are schematic views of light patterns generated by structured light projectors according to some embodiments of the invention.
Figure 4B:
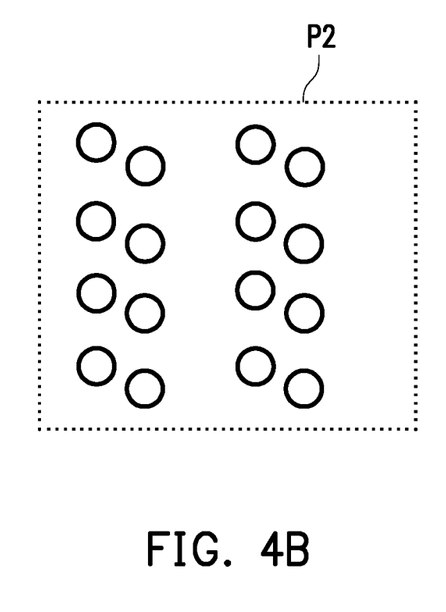

FIG. 4A and FIG. 4B are schematic views of light patterns generated by structured light projectors according to some embodiments of the invention. Referring to FIG. 4A and FIG. 4B, FIG. 4A illustrates a regular light pattern P1, and FIG. 4B illustrates a quasi-random light pattern P2. The regular light pattern P1 and the quasi-random light pattern P2 are, for example, light patterns which are generated when the structure light illuminates a plane perpendicular to an optical axis of a structure light projector. As mentioned above, the lateral displacement D between the ordinary beam L1 and the extraordinary beam L2 is in relation to the thickness d of the beam multiplication film 120a and the inclined angle θ of the optical axis A. Therefore, by appropriate design of thickness and alignment direction of the beam multiplication film 120, the regular light pattern P1 as shown in FIG. 4A or the quasi-random light pattern P2 as shown in FIG. 4B can be generated. Specially, if the light source 110 is a VCSEL, by using the beam multiplication film 120 with different thickness or alignment direction, another photo mask is not needed to fabricate another pattern of illumination points of the VCSEL, which helps reduce the cost.

Figure 5A:
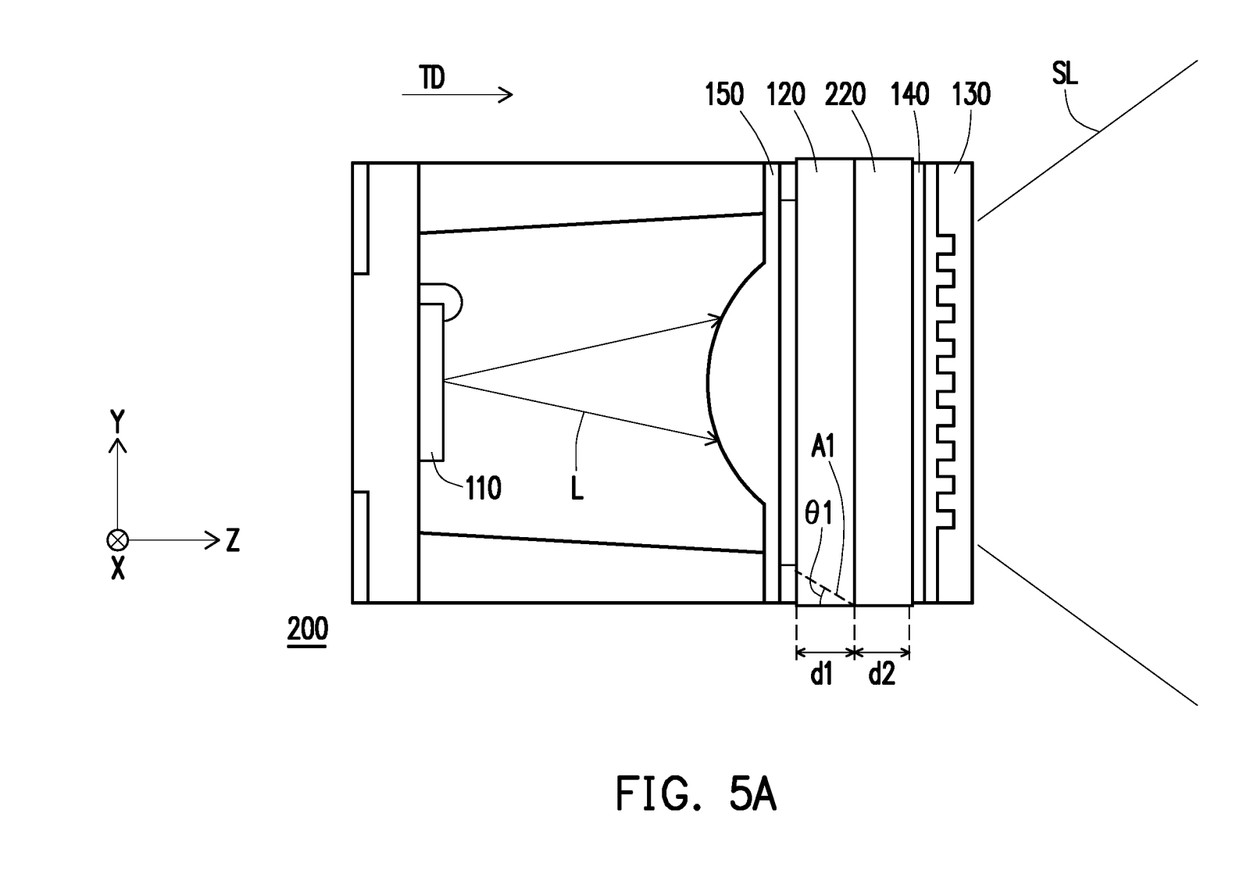
FIG. 5A and FIG. 5B are schematic cross-sectional views of a structured light projector in different viewpoints according to an embodiment of the invention.
Figure 5B:
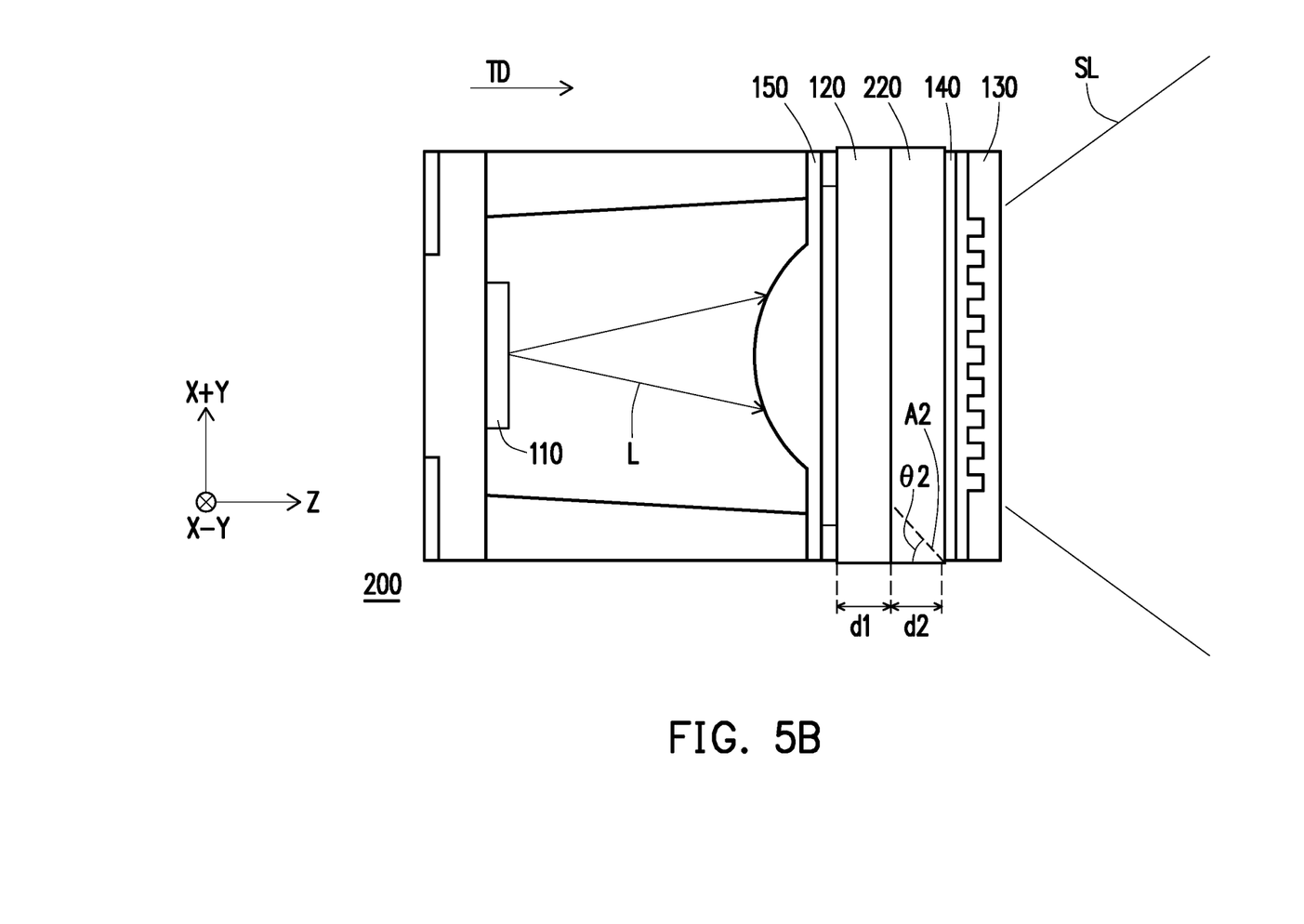

FIG. 5A and FIG. 5B are schematic cross-sectional views of a structured light projector in different viewpoints according to an embodiment of the invention. The structured light projector illustrated in FIG. 5B is counterclockwise rotated around the Z axis of the structured light projector illustrated in FIG. 5A by 45 degrees, for example. Referring to FIG. 5A and FIG. 5B, a structured light projector 200 of the embodiment is substantially similar to the structured light projector 100, and the differences there between are as follows. The number of the beam multiplication films is two, and optical axes of the two beam multiplication films are inclined relative to a transmission direction TD of the light beam L emitted from the light source 110 by angles respectively existing in different reference planes which are not parallel or perpendicular to each other.

To be specific, the structured light projector 200 has another beam multiplication film 220 disposed between the beam multiplication film 120 and the wave plate 140. An optical axis A2 of the beam multiplication film 220 is inclined relative to a transmission direction TD of the light beam L emitted from the light source 110 by an angle θ2 which is different from angle θ1. In the present embodiment, the angle θ1 exists in a reference plane, e.g. YZ plane, and the angle θ2 exists in another reference plane, e.g. in which X+Y axis and Z axis exist. In other embodiments, the reference planes in which the angle θ1 and the angle θ2 exist can be other planes which are not parallel or perpendicular to each other, and the invention is not limited thereto. In other words, the included angle between the reference planes in which the angle θ1 and the angle θ2 exist may be greater than 0 degree and less than 90 degrees but not equal to 45 degrees. Moreover, in other embodiments, the value of the angle θ1 may be the same as the value of the angle θ2.

Since the polarization state of the light beam L is changed to linear polarization after passing through the beam multiplication film 120, the inclined angle θ2 of the optical axis A2 of the beam multiplication film 220 may exist in another reference plane different from the reference plane in which the inclined angle θ1 of the optical axis A1 of the beam multiplication film 120 exists, such that the light beams passing through the beam multiplication film 120 can be further split into multiple light beams after passing through the beam multiplication film 220.

In the embodiment, the thickness d1 of the beam multiplication film 120 may be the same as the thickness d2 of the beam multiplication film 220, or the thickness d1 of the beam multiplication film 120 may be different from the thickness d2 of the beam multiplication film 220, and the invention is not limited thereto. Besides, in other embodiments, the number of the beam multiplication films can be three or more, and optical axes of the three or more beam multiplication films are inclined relative to a transmission direction of the light beam emitted from the light source 110 by angles respectively existing in different reference planes which are not parallel or perpendicular to each other.

Figure 6:
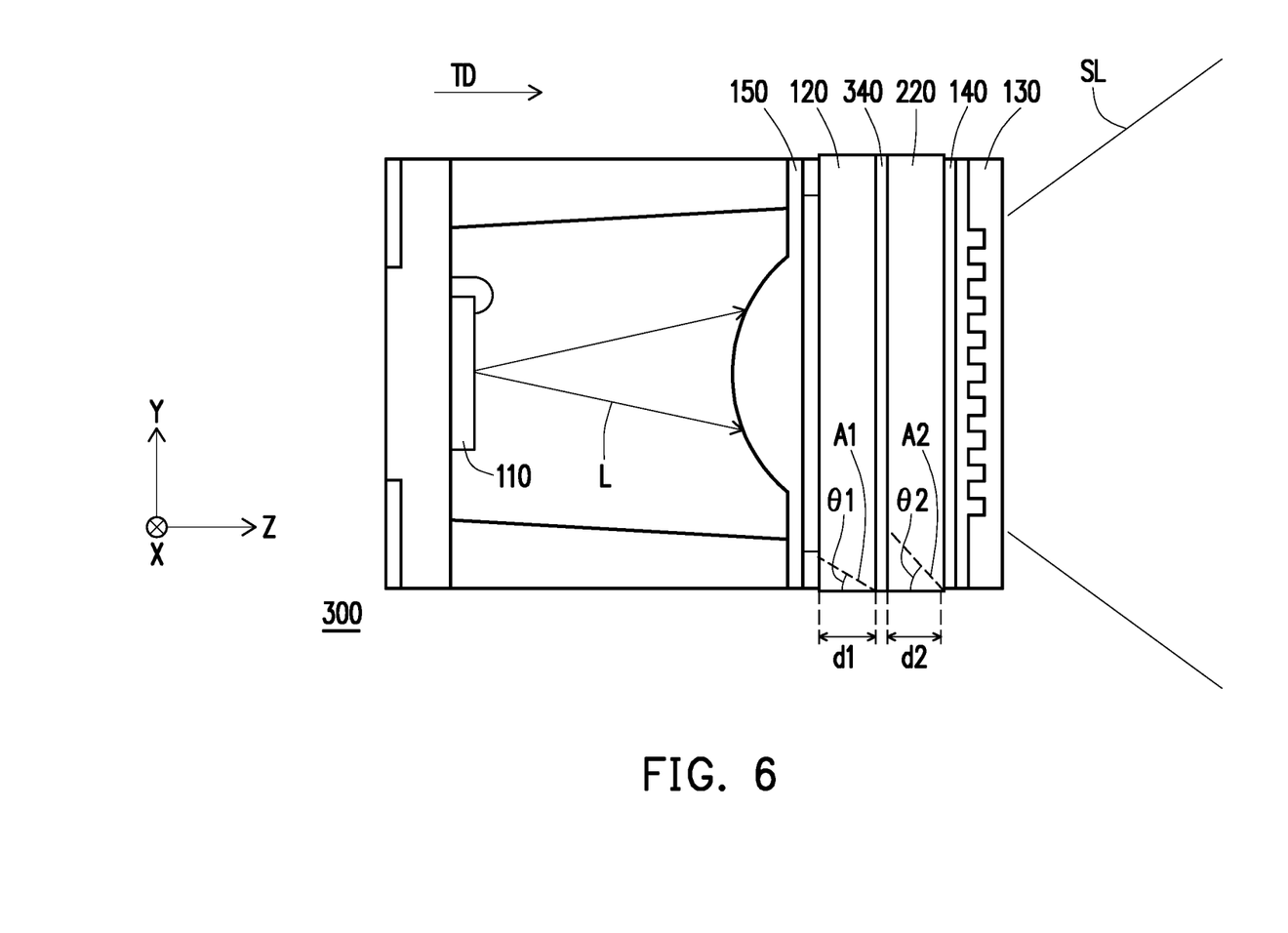
FIG. 6 is a schematic cross-sectional view of a structured light projector according to an embodiment of the invention.

FIG. 6 is a schematic cross-sectional view of a structured light projector according to an embodiment of the invention. Referring to FIG. 6, a structured light projector 300 of the embodiment is substantially similar to the structured light projector 200, and the differences therebetween are as follows. The structured light projector 300 further includes a wave plate 340 disposed between adjacent beam multiplication film 120 and beam multiplication film 220. Since the polarization state of the light beam L is changed from linear polarization to circular polarization or elliptical polarization after passing through the wave plate 340, the inclined angle θ2 of the optical axis A2 of the beam multiplication film 220 can exist in the same reference plane where the inclined angle θ1 of the optical axis A1 of the beam multiplication film 120 exists. Of course, the inclined angle θ2 of the optical axis A2 of the beam multiplication film 220 can exist in another reference plane different from the reference plane where the inclined angle θ1 of the optical axis A1 of the beam multiplication film 120 exists, and the invention is not limited thereto.

In other embodiments, the number of the beam multiplication films can be three or more, and the structured light projector 300 further include two or more wave plates 340. Each one of the wave plates 340 is disposed between the adjacent two of the three or more beam multiplication films.

In view of the foregoing, the structured light projector provided by one of the embodiments of the invention includes at least one beam multiplication film made of anisotropic refractive index material. Since the light beam from the light source is split by the at least one beam multiplication film into multiple light beams corresponding to a plurality of polarization directions, so that the structured light projector of the embodiment of the invention is capable of effectively producing structured light by using a simple structure. Besides, the structured light projector provided by one of the embodiments of the invention uses the aforementioned structured light projector, and therefore is capable of producing structured light by using a simple and effective way.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A structured light projector, comprising:
a light source, configured to emit a light beam;
at least two beam multiplication films, disposed on a transmission path of the light beam and made of anisotropic refractive index material, wherein a plurality of separated light beams are produced after the light beam from the light source passes through any one of the at least two beam multiplication films, so as to form structured light;
a wave plate, disposed between each of adjacent two of the at least two beam multiplication films, wherein a polarization state of the light beam is changed from linear polarization to circular polarization or elliptical polarization after the light beam passes through the wave plate; and
another wave plate, disposed between adjacent two of the at least two beam multiplication films and a diffractive optical element, wherein a polarization state of the light beam is changed from linear polarization to circular polarization or elliptical polarization after the light beam passes through the another wave plate.

2. The structured light projector according to claim 1, wherein optical axes of the at least two beam multiplication films are inclined relative to a transmission direction of the light beam emitted from the light source by an angle.

3. The structured light projector according to claim 1, wherein the diffractive optical element is configured to perform at least one of beam shaping and beam multiplication, wherein the at least two beam multiplication films are disposed between the light source and the diffractive optical element.

4. The structured light projector according to claim 1, further comprising a lens module disposed on the transmission path of the light beam, wherein the lens module is configured to perform at least one of beam shaping and beam collimation.

5. The structured light projector according to claim 1, wherein the at least two beam multiplication films comprise uniaxial retardation films, biaxial retardation films, or oblique axial retardation films.

6. The structured light projector according to claim 1, wherein the at least two beam multiplication films comprise flexible films.

7. The structured light projector according to claim 1, wherein optical axes of the at least two beam multiplication films are inclined relative to a transmission direction of the light beam emitted from the light source by different angles.

8. The structured light projector according to claim 1, wherein the light source comprises an edge emitting laser or a vertical-cavity surface-emitting laser.

* * * * *